(12) United States Patent
Nishiyama

(10) Patent No.: US 11,474,584 B2
(45) Date of Patent: Oct. 18, 2022

(54) SEMICONDUCTOR DEVICE HAVING CLOCK CONTROL CIRCUIT OF ADJUSTING SPEED OF INCREASING CLOCK FREQUENCY

(71) Applicant: FUJITSU LIMITED, Kawasaki (JP)

(72) Inventor: Ryuichi Nishiyama, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/219,925

(22) Filed: Apr. 1, 2021

(65) Prior Publication Data
US 2021/0373635 A1    Dec. 2, 2021

(30) Foreign Application Priority Data
Jun. 2, 2020    (JP) ................ JP2020-095892

(51) Int. Cl.
     *G06F 1/30*      (2006.01)
     *G06F 1/08*      (2006.01)

(52) U.S. Cl.
     CPC .............. *G06F 1/305* (2013.01); *G06F 1/08* (2013.01)

(58) Field of Classification Search
     CPC ................... G06F 1/305; G06F 1/08
     See application file for complete search history.

(56) References Cited

U.S. PATENT DOCUMENTS

| | | | |
|---|---|---|---|
| 6,762,629 B2* | 7/2004 | Tam | G06F 1/08 327/114 |
| 2005/0076259 A1 | 4/2005 | Fischer et al. | |
| 2011/0115567 A1 | 5/2011 | Sutardja | |
| 2011/0191607 A1* | 8/2011 | Gunther | G06F 1/3296 713/300 |
| 2013/0318539 A1* | 11/2013 | Dighe | G06F 1/329 718/105 |
| 2015/0177824 A1* | 6/2015 | Ganpule | G06F 1/324 713/322 |
| 2017/0075404 A1 | 3/2017 | Kitaji et al. | |
| 2018/0314319 A1* | 11/2018 | Kumar | G06F 1/324 |
| 2020/0089299 A1* | 3/2020 | Kim | H03L 7/097 |

FOREIGN PATENT DOCUMENTS

| | | |
|---|---|---|
| JP | 2005-115944 A | 4/2005 |
| JP | 2013-511096 A | 3/2013 |
| JP | 2017-58911 A | 3/2017 |

\* cited by examiner

*Primary Examiner* — Zahid Choudhury
(74) *Attorney, Agent, or Firm* — Fujitsu Patent Center

(57) ABSTRACT

A semiconductor device includes a power supply; and a plurality of processor cores configured to operate with the power supply, wherein each of the plurality of processor cores includes a clock control circuit that decreases an own clock frequency used by an own processor core when detecting drop of a power supply voltage of the own processor core, and adjusts a speed at which the own clock frequency is increased according to a situation of a power supply voltage of another processor core among the plurality of processor cores.

18 Claims, 22 Drawing Sheets

FIG. 21
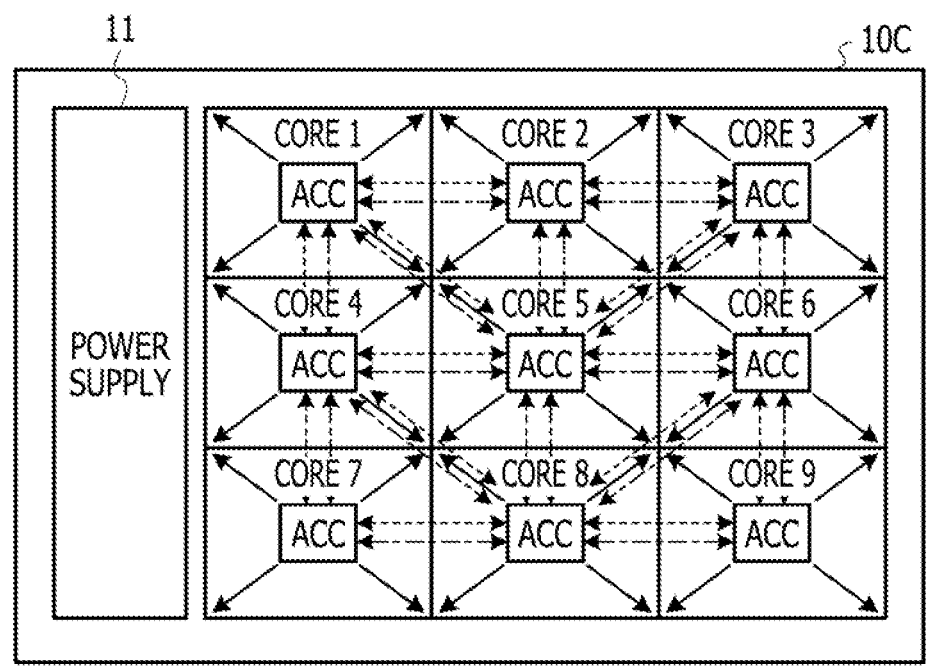
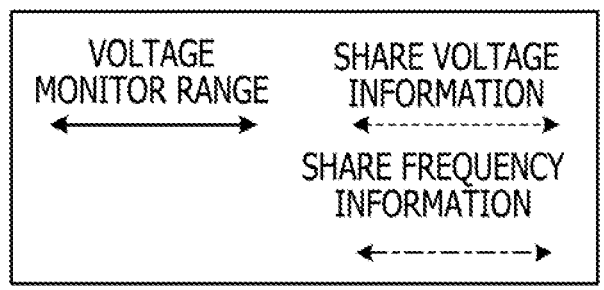

SEMICONDUCTOR DEVICE HAVING CLOCK CONTROL CIRCUIT OF ADJUSTING SPEED OF INCREASING CLOCK FREQUENCY

CROSS-REFERENCE TO RELATED APPLICATION

This application is based upon and claims the benefit of priority of the prior Japanese Patent Application No. 2020-95892, filed on Jun. 2, 2020, the entire contents of which are incorporated herein by reference.

FIELD

The present disclosure discussed herein is related to a semiconductor device.

BACKGROUND

In a semiconductor device such as a Large Scale Integrated circuit (LSI), when consumption current increases due to a rapid increase in a calculation load or the like, there is a case where a power supply voltage temporarily drops. There is a technology for suppressing occurrence of a timing error in a semiconductor device by decreasing a clock frequency in a case of detecting drop of a power supply voltage (Adaptive Clocking Control (ACC)). Moreover, when the dropped power supply voltage is recovered after the clock frequency is decreased, the ACC restores (increases) the clock frequency to suppress a performance deterioration of the semiconductor device due to the decrease in the clock frequency. For example, as related art, Japanese National Publication of International Patent Application No. 2013-511096, Japanese Laid-open Patent Publication No. 2005-115944, and Japanese Laid-open Patent Publication No. 2017-058911, and the like are disclosed.

Japanese National Publication of International Patent Application No. 2013-511096, Japanese Laid-open Patent Publication No. 2005-115944, and Japanese Laid-open Patent Publication No. 2017-058911 are disclosed as related art.

SUMMARY

According to an aspect of the embodiments, A semiconductor device includes a power supply; and a plurality of processor cores configured to operate with the power supply, wherein each of the plurality of processor cores includes a clock control circuit that decreases an own clock frequency used by an own processor core when detecting drop of a power supply voltage of the own processor core, and adjusts a speed at which the own clock frequency is increased according to a situation of a power supply voltage of another processor core among the plurality of processor cores.

The object and advantages of the invention will be realized and attained by means of the elements and combinations particularly pointed out in the claims.

It is to be understood that both the foregoing general description and the following detailed description are exemplary and explanatory and are not restrictive of the invention.

According to the present disclosure, it is possible to provide a semiconductor device that can suppress a performance deterioration due to a decrease in a clock frequency.

BRIEF DESCRIPTION OF DRAWINGS

FIG. 21 is a diagram illustrating an exemplary configuration of a semiconductor device in which information regarding the power supply voltage and the clock frequency is shared between the cores.

DESCRIPTION OF EMBODIMENTS

However, some semiconductor devices include a plurality of processor cores that operates with a common power supply. In a case where an ACC is applied to such a semiconductor device, even if clock frequencies of the processor cores are simultaneously increased, re-drops of power supply voltages of some or all of the processor cores are detected, and it is requested not to re-decrease the clock frequency.

However, when the re-drop of the power supply voltage is detected and the clock frequencies of the processor cores are uniformly and slowly increased so as not to re-decrease the clock frequency, a time period before each clock frequency is restored is prolonged. As a result, a state where a performance of the semiconductor device is deteriorated is prolonged.

In view of the above, it is desirable to suppress a performance deterioration due to a decrease in a clock frequency.

When a calculation load and the number of operating circuits largely change, there is a case where a power supply noise (simultaneous switching noise) occurs in a Large Scale Integrated circuit (LSI). For example, when a calculation load in a multi-core LSI suddenly increases from an idle state, there is a case where a power supply voltage of the LSI drops due to an instantaneous increase in consumption current. When the power supply voltage of the LSI drops, in a case where a sufficient voltage is not applied to a circuit in the LSI, there is a case where a signal delay occurs in the circuit and this causes a timing error.

Figure 1:
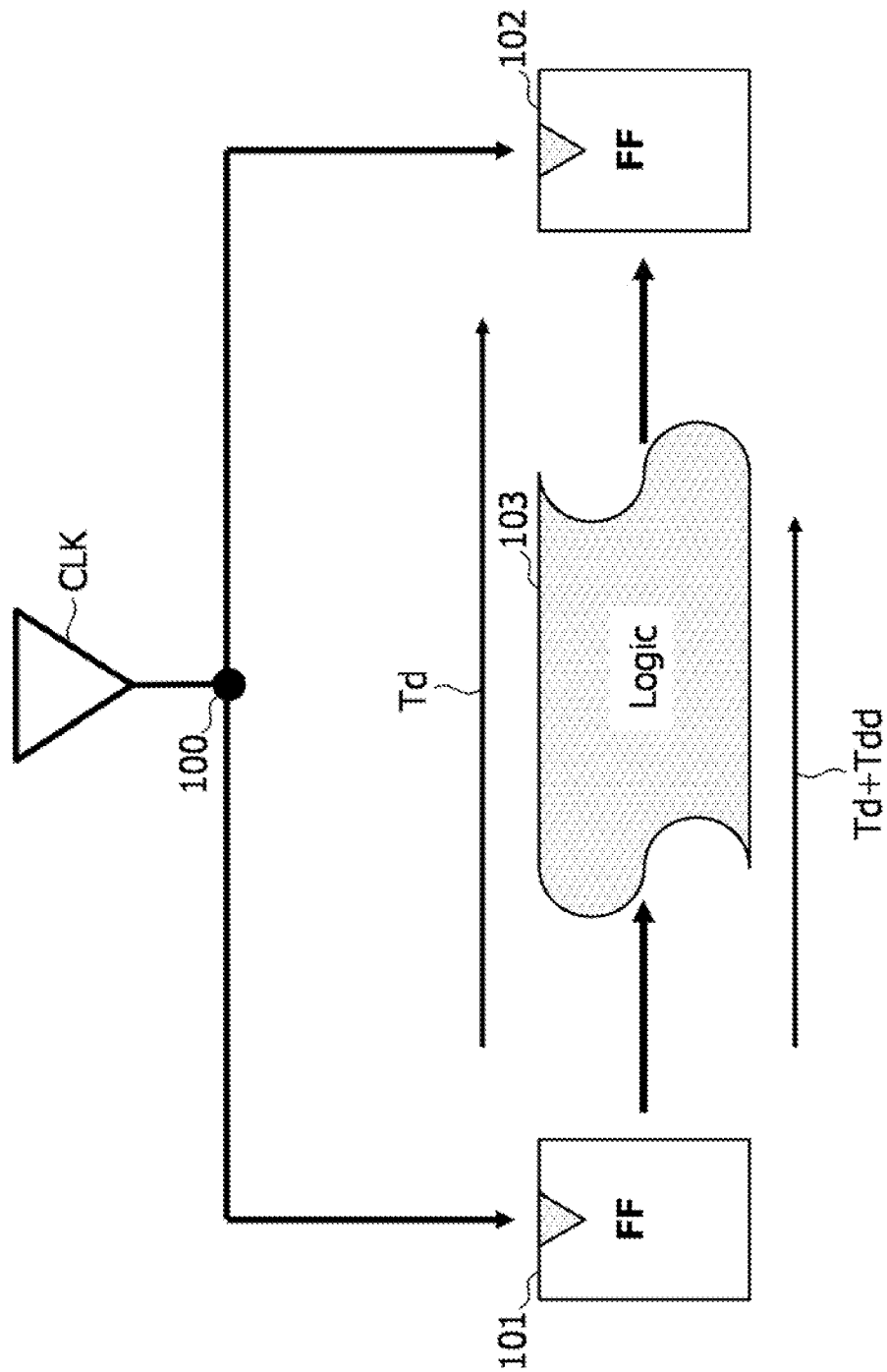
FIG. 1 is a diagram for explaining a signal delay due to voltage drop.

FIG. 1 is a diagram for explaining a signal delay due to voltage drop. A clock CLK supplied from a clock driver is a signal that is supplied to a transmitting-side flip-flop (FF) 101 and a receiving-side FF 102 via a branch point 100. Data transmitted from the FF 101 according to the clock CLK is input to the FF 102 via a logic circuit 103. The data input to the FF 102 is latched according to the clock CLK.

Figure 2:
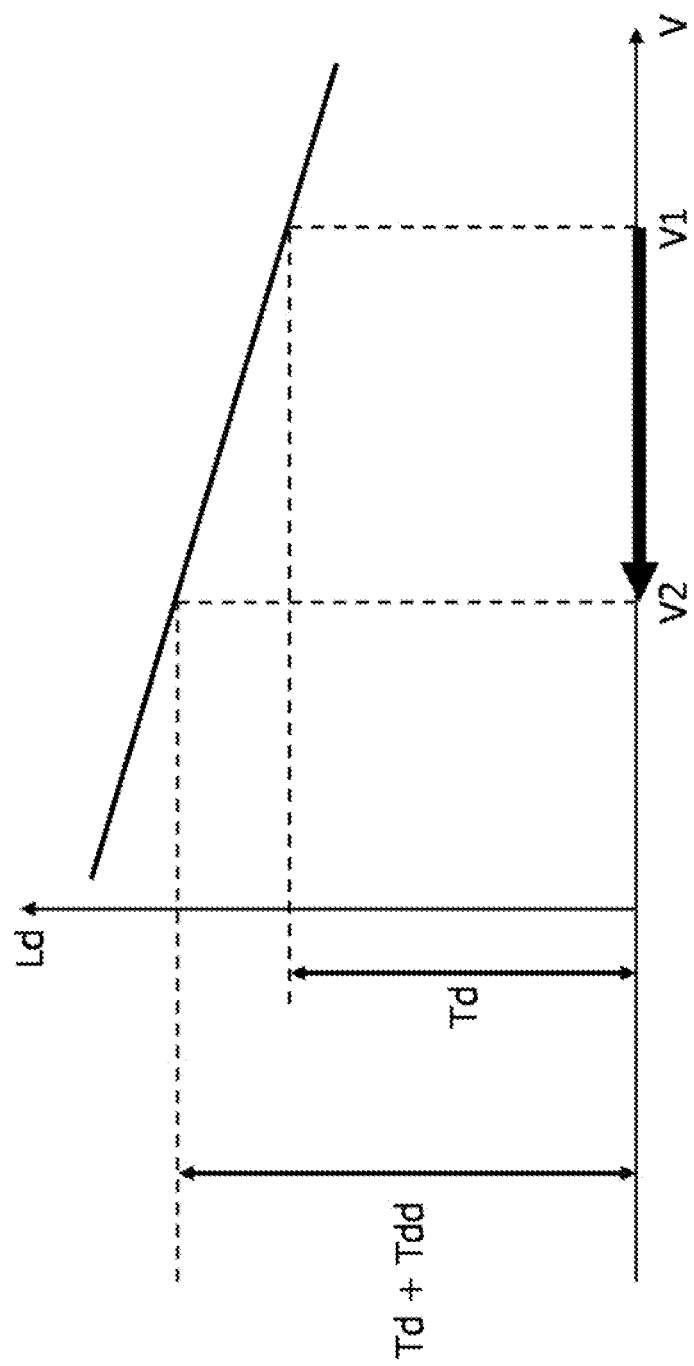
FIG. 2 is a diagram for explaining a passing delay of a logic circuit.

However, as illustrated in FIG. 2, when a power supply voltage V of the logic circuit 103 drops from a voltage value V1 to a voltage value V2, a signal delay time Ld generated in the logic circuit 103 may increase from Td to "Td+Tdd". Td represents a delay time when the power supply voltage V does not drop, and Tdd represents an increase in the delay time due to the drop of the power supply voltage V.

Figure 3:
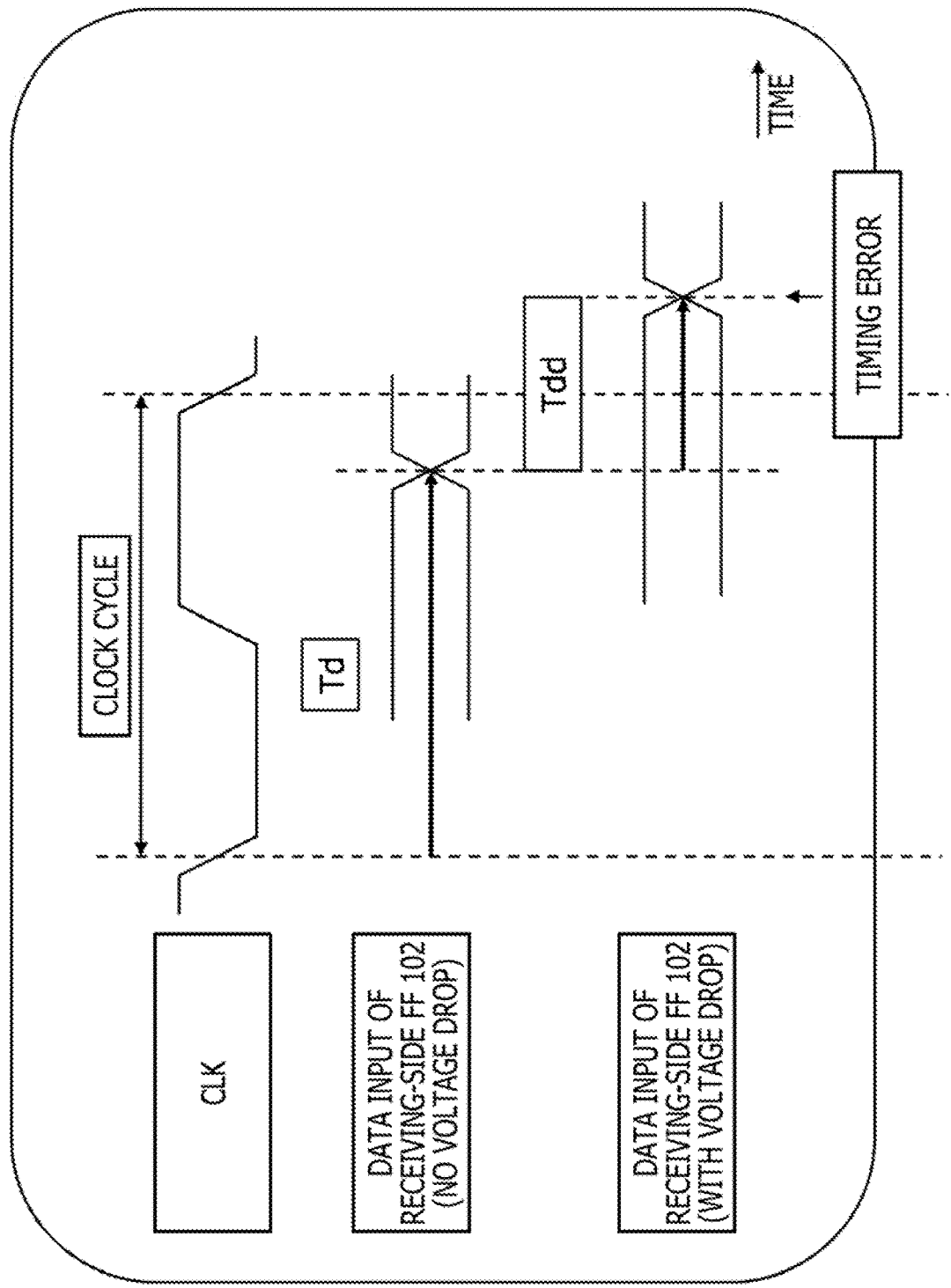
FIG. 3 is a diagram for explaining a timing error.

For example, in FIG. 3, data transmitted from the FF 101 at a down edge of the clock CLK originally reaches the FF 102 via the logic circuit 103 before the next down edge. However, when the signal delay in the logic circuit 103 increases due to the drop of the power supply voltage V, there is a case where data does not reach the FF 102 before the next down edge and a timing error occurs in the FF 102.

Figure 4:
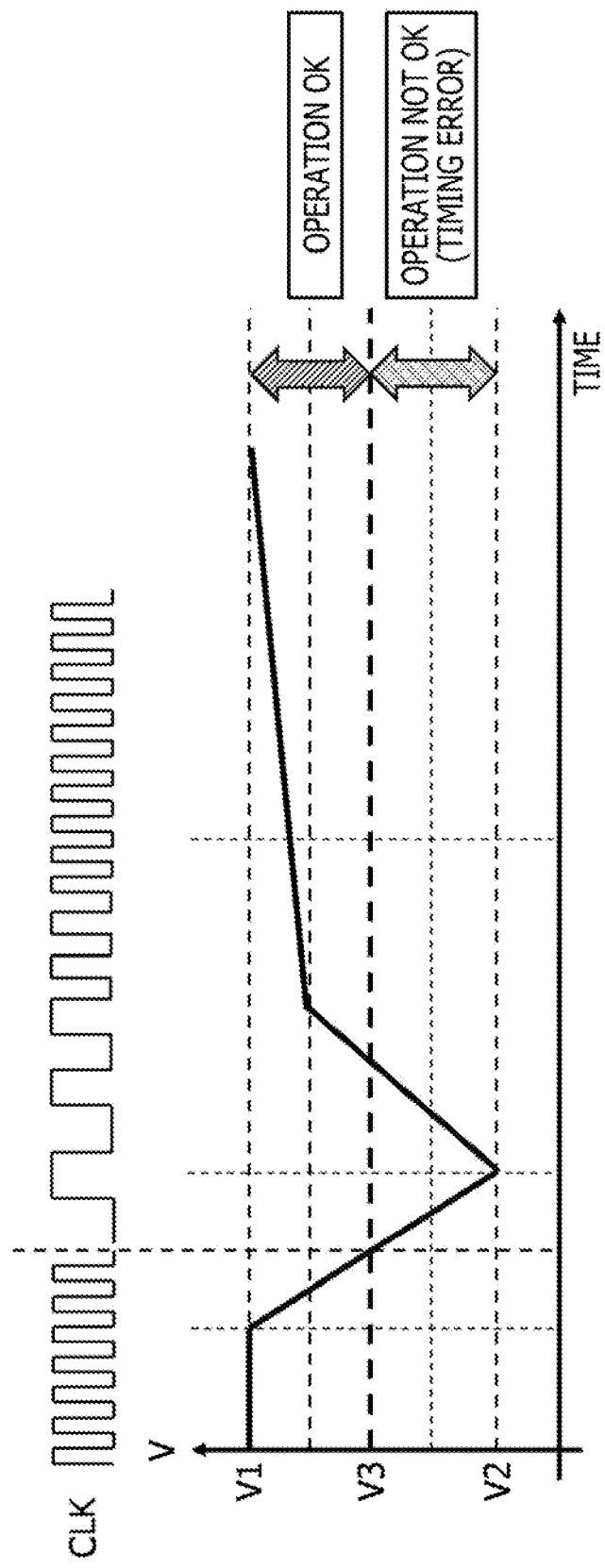
FIG. 4 is a diagram for explaining an outline of an Adaptive Clocking Control (ACC) operation.

FIG. 4 is a diagram for explaining an outline of an ACC operation that can suppress occurrence of the timing error. Voltage values V1, V2, and V3 respectively indicate a steady value of the power supply voltage V, a voltage value dropped from the power supply voltage V at the maximum extent, and a timing limit value of Static Timing Analysis (STA). For example, in a case of detecting that a power supply voltage V detected by a power supply voltage sensor is dropped to a value equal to or less than the voltage value V3 at which a timing error occurs, an ACC circuit suppresses the occurrence of the timing error of the LSI by decreasing a frequency of the clock CLK (activate ACC). Thereafter, when the power supply voltage V is recovered to a voltage value higher than the voltage value V3, the ACC circuit limits a period in which the clock frequency is decreased by returning the decreased clock frequency to a normal value that is a value before being decreased (frequency restoration operation), and suppresses a deterioration of a calculation performance of the LSI.

Figure 5:
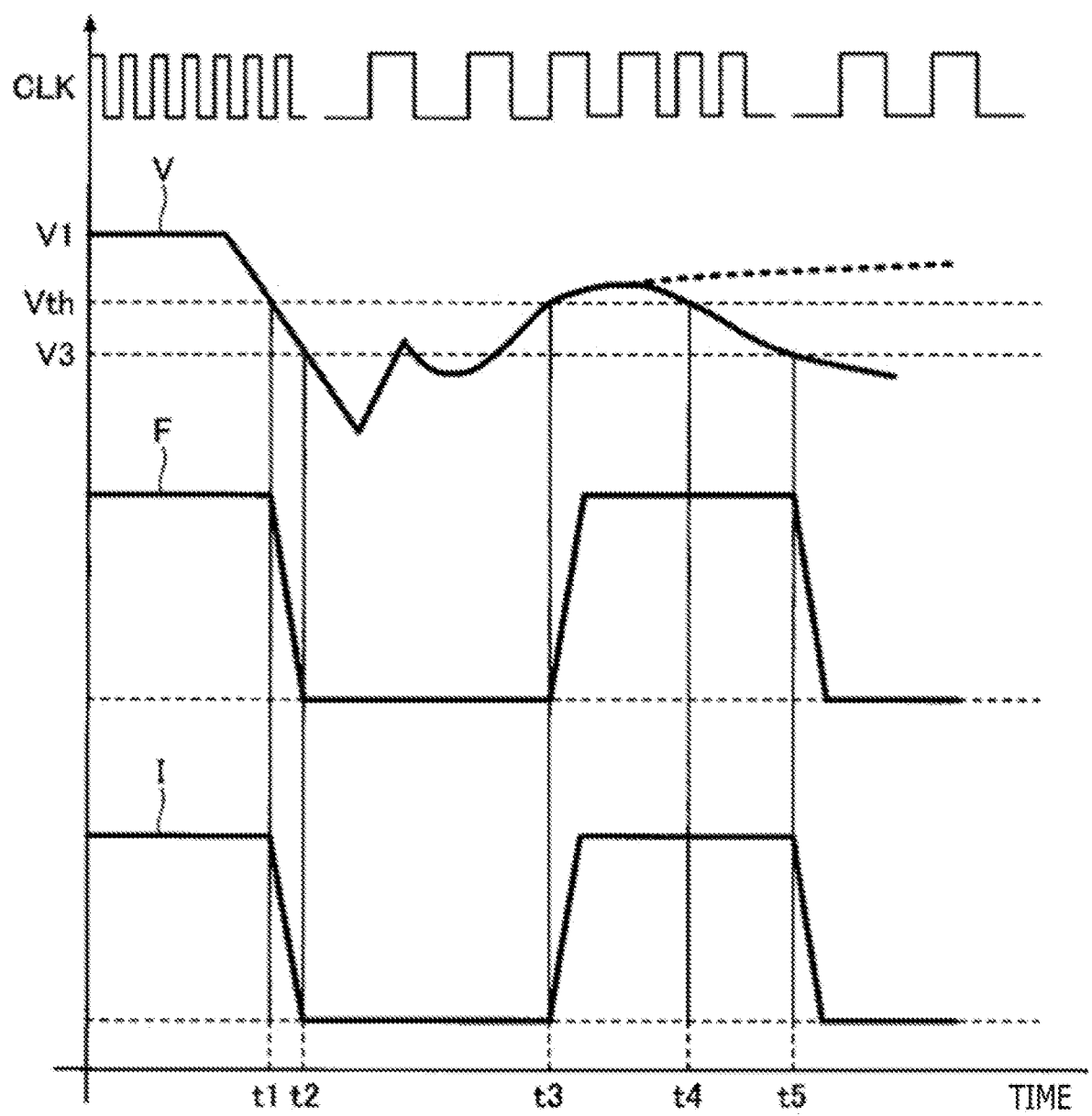
FIG. 5 is a diagram for explaining a re-decrease of a power supply voltage due to an increase in an operating frequency.

For example, in FIG. 5, the ACC circuit restores (increase) a clock frequency F of the LSI (timing t3) after the power supply voltage V is recovered to a value equal to or more than a reference value Vth at which no timing error occurs. However, when the clock frequency F is rapidly increased at the timing t3, consumption current I of the LSI is rapidly increased, and there is a case where the power supply voltage V drops again to a value equal to or less than the voltage value V3 at which a timing error occurs. When the ACC is activated again due to the re-drop of the power supply voltage V, the clock frequency F is decreased again. Therefore, deterioration of calculation performance of the LSI occurs intermittently.

Figure 6:
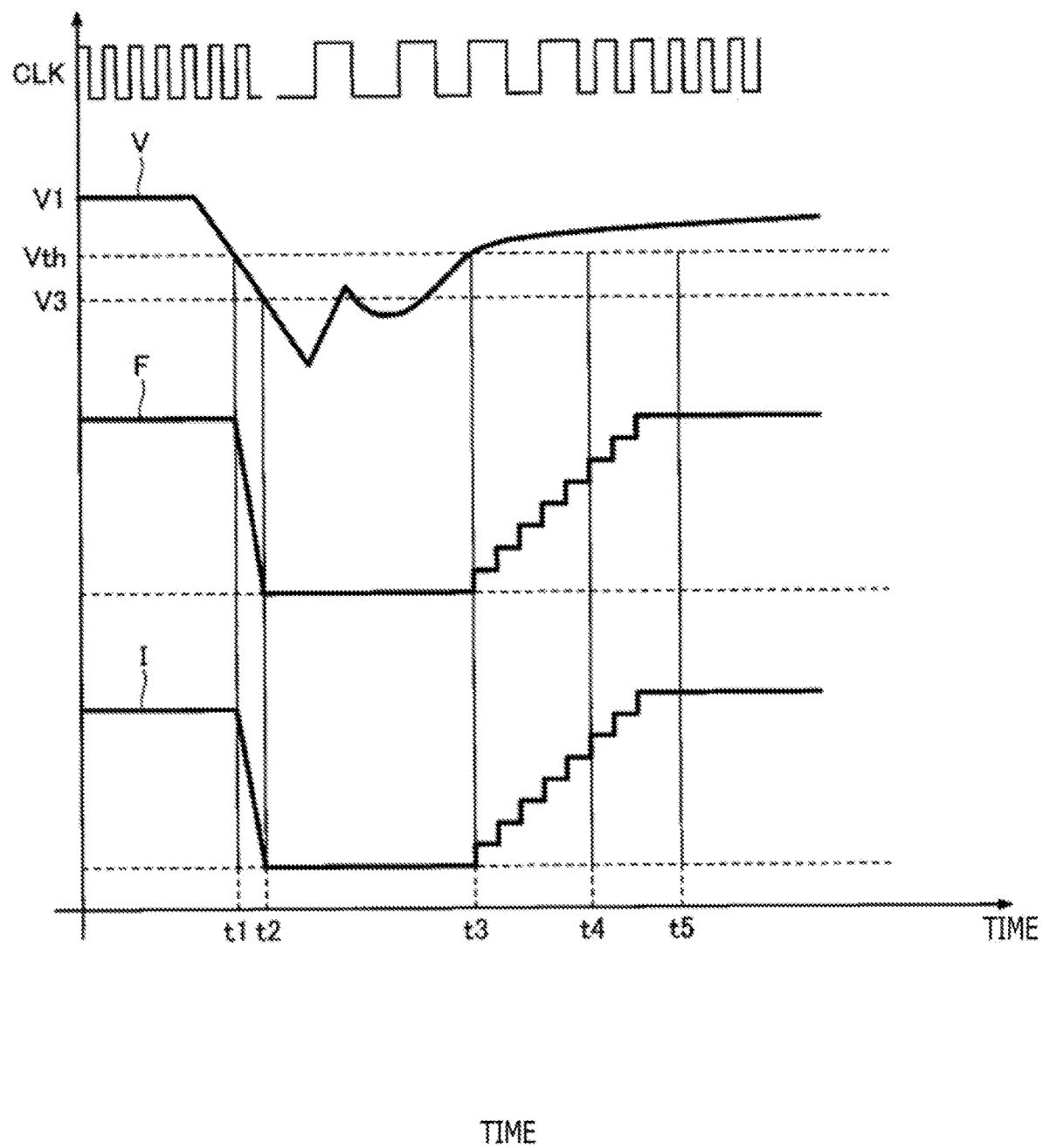
FIG. 6 is a diagram illustrating an example of a method for restoring a clock frequency to avoid the re-decrease of the power supply voltage.

To avoid occurrence of the re-activation of the ACC as described above, the ACC circuit can suppress the re-deterioration of the calculation performance of the LSI by gradually increasing the clock frequency F after the power supply voltage V is recovered to the value equal to or more than the reference value Vth at which no timing error occurs (refer to FIG. 6).

Figure 7:
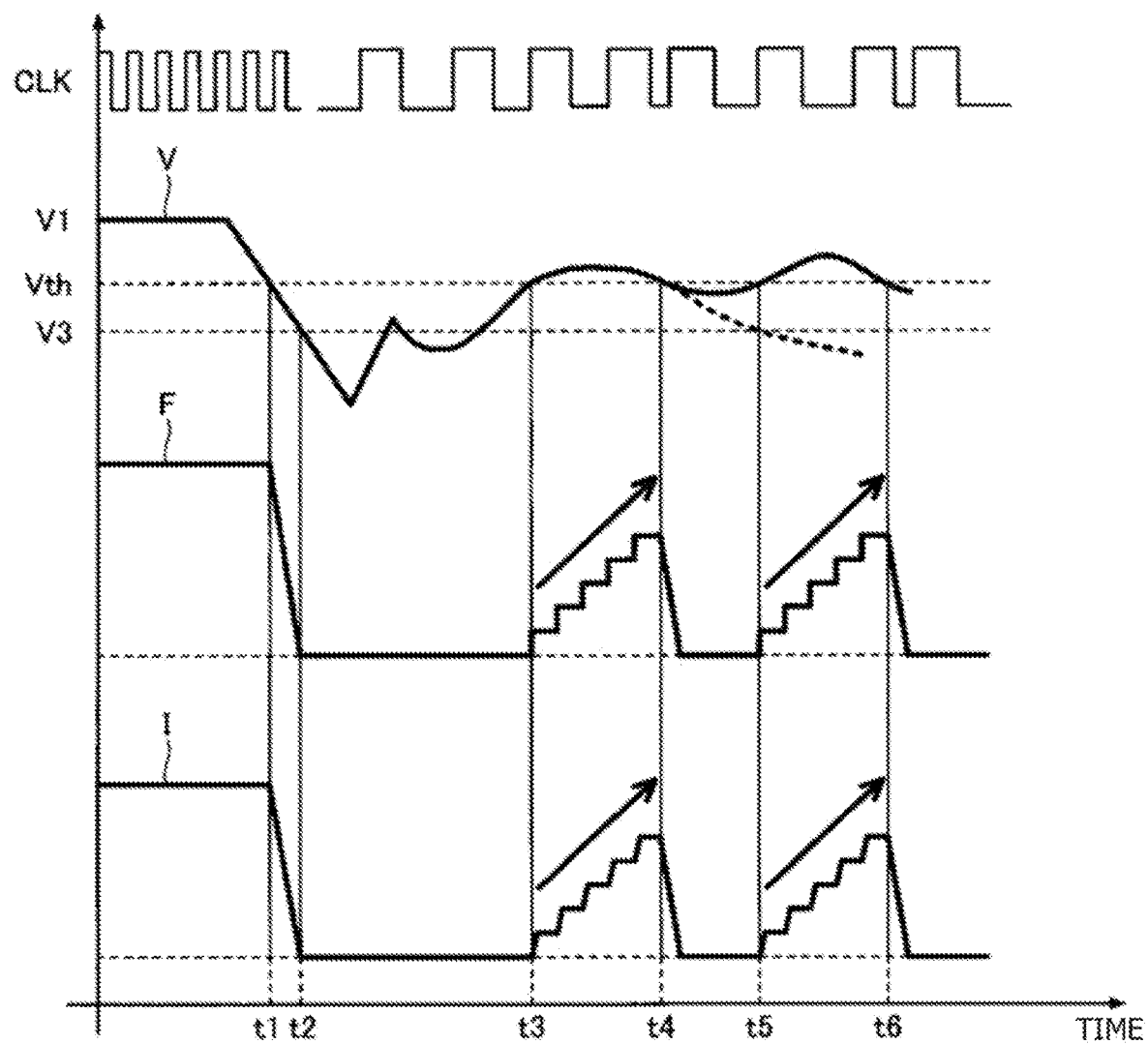
FIG. 7 is a diagram illustrating an example of a case where an ACC is frequently reactivated due to premature frequency restoration.

By the way, some semiconductor devices include a plurality of processor cores that operates with a common power supply. In a case where the ACC is applied to such a semiconductor device, it is requested to increase the clock frequency F of each of the processor cores so as not to reactivate the ACC due to the drop of the power supply voltages V of some or all of the processor cores. If the clock frequencies F of some or all the processor cores are restored too quickly, the power supply voltage V drops again due to an increase in the consumption current I, and there is a possibility that the ACC is frequently reactivated (refer to FIG. 7). When detecting the drop of the power supply voltage of each processor core, each processor core suppresses occurrence of an own timing error in the processor core by decreasing the own clock frequency of the processor core. Therefore, even in the worst case where the respective clock frequencies are simultaneously increased after the ACCs are simultaneously reactivated in the respective processor cores, it is requested not to reactivate the ACC due to voltage drop.

However, when each clock frequency is slowly increased at the same increasing speed that is preset not to reactivate the ACC due to the voltage drop in consideration of such a worst case, a time period before each clock frequency is restored to the original value is lengthened. This long restoration time prolongs a state where the calculation performance of the semiconductor device including the plurality of processor cores is deteriorated.

A semiconductor device according to one embodiment of the present disclosure has a configuration that suppresses a performance deterioration due to a decrease in a clock frequency. The semiconductor device according to one embodiment of the present disclosure includes a plurality of processor cores that operates with a common power supply, and each of the plurality of processor cores includes a clock control circuit Each clock control circuit has an ACC function that decreases a clock frequency (own clock frequency) used by the own processor core when detecting drop of a power supply voltage of the own processor core.

In a case where each processor core operates with the common power supply, a speed at which the power supply voltage of each processor core is recovered depends on not only an operating state of the own processor core but also operating states of other processor cores. Using this dependency, each clock control circuit of the semiconductor device according to one embodiment of the present disclosure has a function for adjusting the speed at which the own clock frequency is increased according to situations of the power supply voltages of the other processor cores that operate with a power supply common to the own processor core. With this adjustment function, in consideration of the situation of the power supply voltage of the other processor core that affects a recovery speed of the power supply voltage of the own processor core, it is possible to adjust the speed at which the own clock frequency is increased to an appropriate speed at which drop of the power supply voltage of the own processor core is not detected. Therefore, it is possible to suppress the performance deterioration of the semiconductor device due to the decrease in the clock frequency.

Furthermore, each clock control circuit decreases the own clock frequency used by the own processor core when detecting the drop of the power supply voltage of the own processor core. Therefore, it Is possible to estimate the situation of the power supply voltage of the other processor core from the situation of the clock frequency (other clock frequency) used by the other processor core. Utilizing this point, each clock control circuit of the semiconductor device according to one embodiment of the present disclosure may have a function for adjusting the speed at which the own clock frequency is increased according to the situations of the clock frequencies of the other processor cores that operate with the power supply common to the own processor core. With this adjustment function, in consideration of the situation of the clock frequency of the other processor core that affects the recovery speed of the power supply voltage of the own processor core, it is possible to adjust the speed at which the own clock frequency is increased to an appropriate speed at which the drop of the power supply voltage of the own processor core is not detected. Therefore, it is possible to suppress the performance deterioration of the semiconductor device due to the decrease in the clock frequency.

Furthermore, using the dependency described above, each clock control circuit of the semiconductor device according to one embodiment of the present disclosure can predict a speed at which the power supply voltage of the own processor core is recovered from the situations of the power supply voltages of the other processor cores that operate with the power supply common to the own processor core. Utilizing the dependency described above, each clock control circuit can predict the speed at which the power supply voltage of the own processor core is recovered from the situations of the clock frequencies of the other processor cores that operate with the power supply common to the own processor core.

Each clock control circuit can select the fastest speed at which the own clock frequency is increased within a range in which the ACC is not reactivated from among a plurality of speed candidates according to a prediction result of the recovery speed of the power supply voltage of the own processor core. By increasing the own clock frequency at the selected fastest speed, each clock control circuit can shorten the state where the performance of the semiconductor device is deteriorated due to the decrease in the clock frequency within the range in which the ACC is not reactivated and can effectively suppress the performance deterioration.

Figure 8:
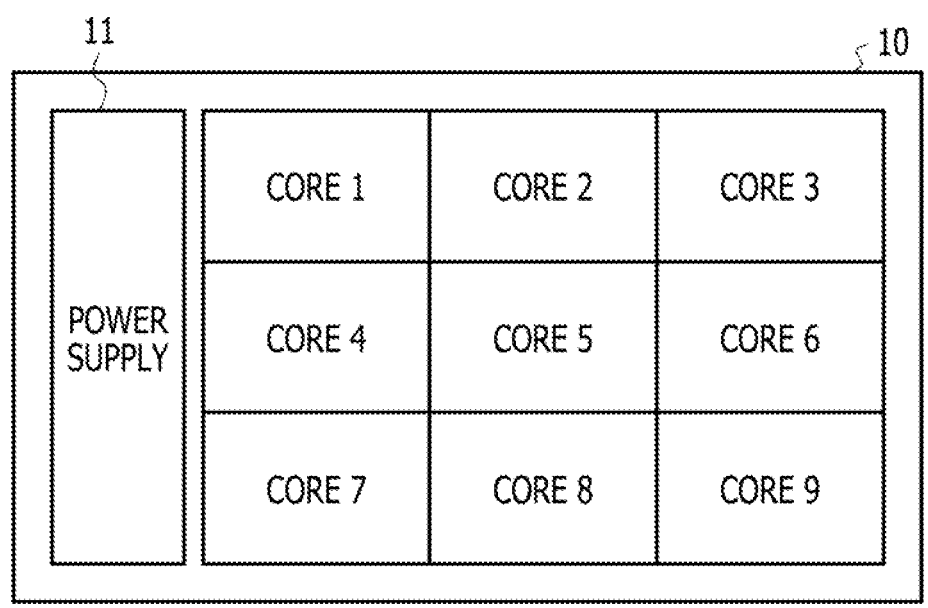
FIG. 8 is a diagram illustrating an exemplary configuration of a semiconductor device.

FIG. 8 is a diagram illustrating an exemplary configuration of the semiconductor device according to one embodiment of the present disclosure. A semiconductor device 10 illustrated in FIG. 8 includes a plurality of (nine in this example) cores 1 to 9 that operates with a common power supply 11. All the cores 1 to 9 are processor cores having a calculation function. The semiconductor device 10 is, for example, a multi-core processor in which the plurality of cores is arranged. A specific example of the multi-core processor is a multi-core LSI. Each of the plurality of cores 1 to 9 includes a clock control circuit.

Figure 9:
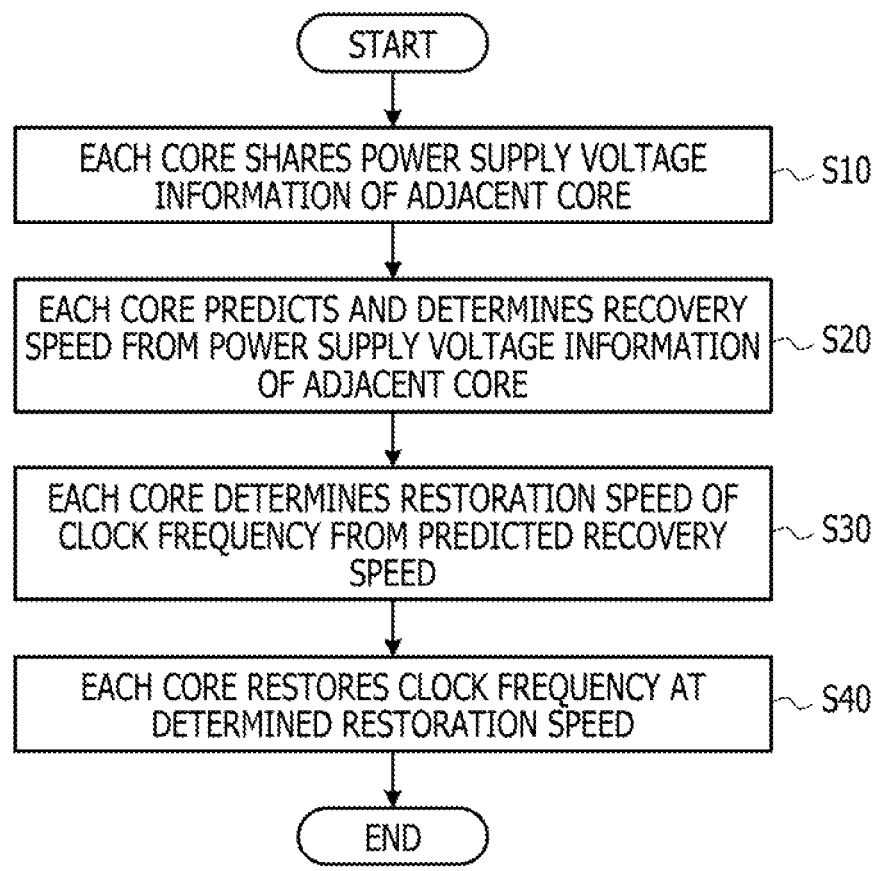
FIG. 9 is a flowchart illustrating an example of a method for restoring the clock frequency.

FIG. 9 is a flowchart illustrating an example of a method for restoring a clock frequency by the clock control circuit of each core. The clock control circuit of each core shares information indicating situations of the respective power supply voltages between the own core and the other cores among the plurality of cores (for example, one or plurality of adjacent cores arranged next to own core) (step S10). The clock control circuit of each core predicts and decides a speed at which the power supply voltage of the own core is recovered to an original state on the basis of the information indicating the situations of the power supply voltages of the other cores acquired in step S10 (step S20). The clock control circuit of each core decides a restoration speed (Increasing speed) associated in advance with the recovery speed predicted and decided in step S20 (step S30). The clock control circuit of each core restores (increase) a clock frequency (own clock frequency) used by the own core at the restoration speed decided in step S30 (step S40).

According to the method illustrated in FIG. 9, it is possible to increase (restore) the clock frequency of the own core at an appropriate speed according to the situations of the power supply voltages of the other cores. Therefore, it is possible to suppress the performance deterioration of the semiconductor device due to the decrease in the clock frequency.

Note that, in step S10, each clock control circuit may share the information indicating the situations of the respective clock frequencies between the own core and the other cores. In this case, in step S20, each clock control circuit may predict and decide a speed at which the power supply voltage of the own core is recovered to the original state on the basis of the information indicating the situations of the clock frequencies of the other cores acquired in step S10. Alternatively, in step S10, each clock control circuit may share the information indicating the situation of each power supply voltage and the information indicating the situation of each clock frequency between the own core and the other cores. In this case, in step S20, each clock control circuit may predict and decide the speed at which the power supply voltage of the own core is recovered to the original value on the basis of the information of both of the power supply voltages and the clock frequencies of the other cores acquired in step S10.

Figure 10:
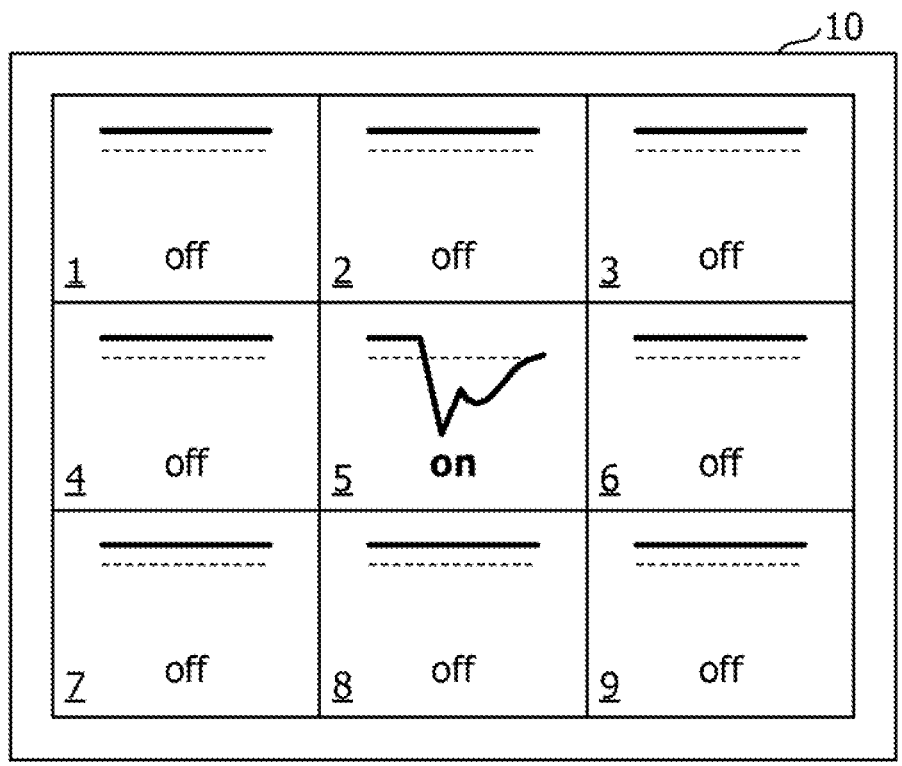
FIG. 10 is a diagram illustrating an example of a case where the clock frequency is restored with only one core.
Figure 11:
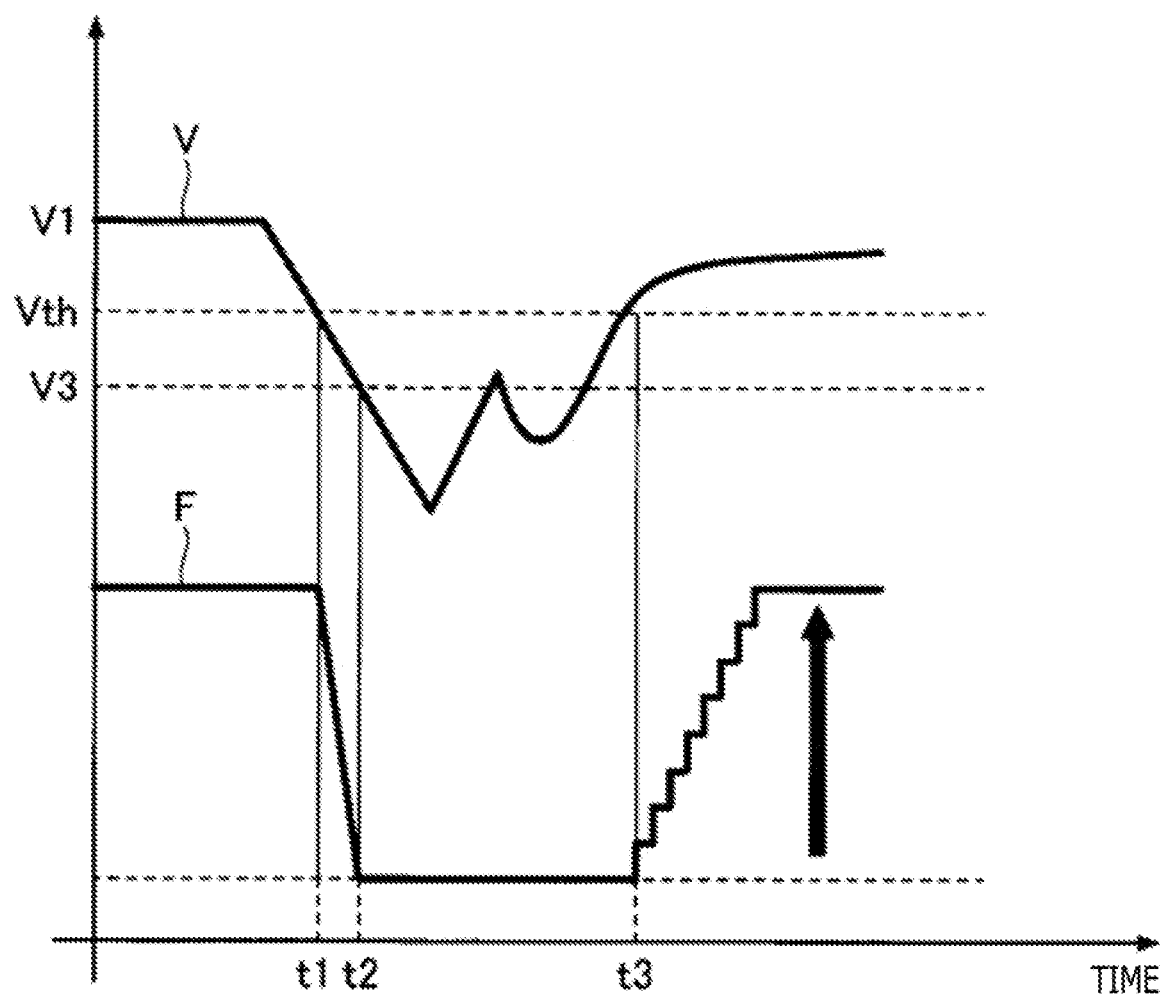
FIG. 11 is a diagram illustrating an example of a method for restoring the clock frequency with only one core.

FIG. 10 is a diagram illustrating an example of a case where the clock frequency is restored with only one core. FIG. 10 illustrates a state where an ACC of only the core 5 is activated (on) and a state where an ACC of each of the cores 1 to 4 and 6 to 9 adjacent to the core 5 is not activated (off). FIG. 11 is a diagram illustrating an example of a method for restoring the clock frequency with only one core. When detecting that a power supply voltage V of the core 5 drops to a value lower than the reference value Vth (timing t1), a clock control circuit of the core 5 decreases a clock frequency F of the core 5 to a value lower than the voltage value V3 (timing t2). As a result, occurrence of a timing error in the core 5 is suppressed due to drop of the power supply voltage V of the core 5. When detecting that the power supply voltage V of the core 5 is increased and recovered to a value equal to or more than the reference value Vth after the clock frequency F of the core 5 is decreased (timing t3), the clock control circuit of the core 5 increases the clock frequency F of the core 5.

In a case of FIGS. 10 and 11, because the ACCs of the cores 1 to 4 and 6 to 9 adjacent to the core 5 are not activated, the clock control circuit of the core 5 predicts that the power supply voltage V of the core 5 is recovered at a relatively early stage. Therefore, the clock control circuit of the core 5 increases the clock frequency F of the core 5 at a relatively high speed corresponding to the prediction result. As a result, because a state where the clock frequency F is decreased can be shortened, it is possible to avoid the performance deterioration of the semiconductor device from being prolonged.

Figure 12:
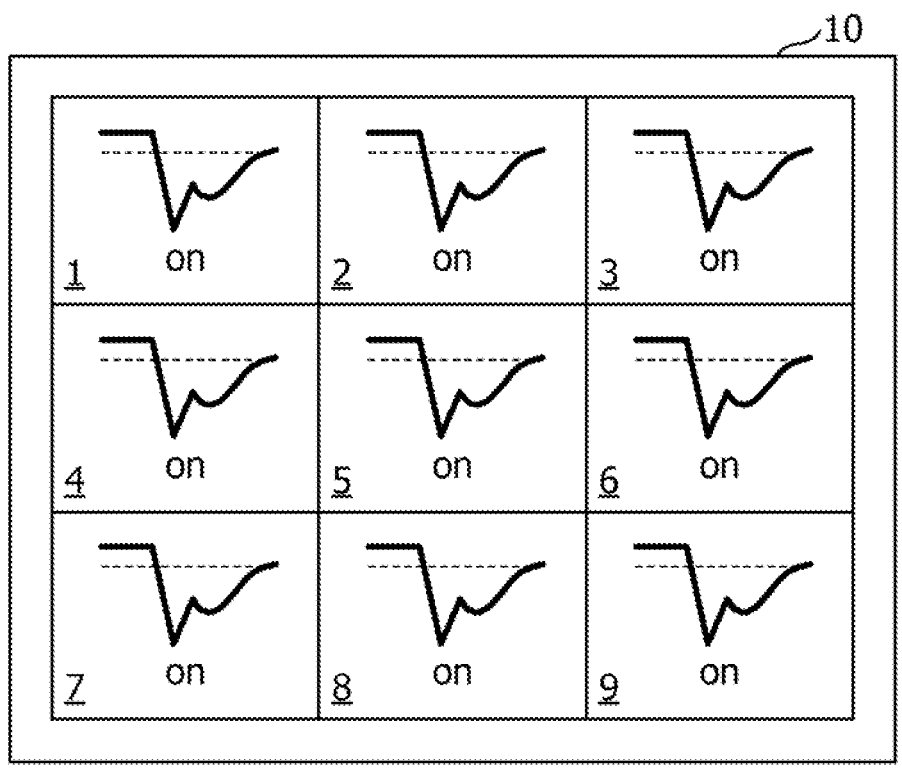
FIG. 12 is a diagram illustrating an example of a case where the clock frequency is restored with a plurality of cores.
Figure 13:
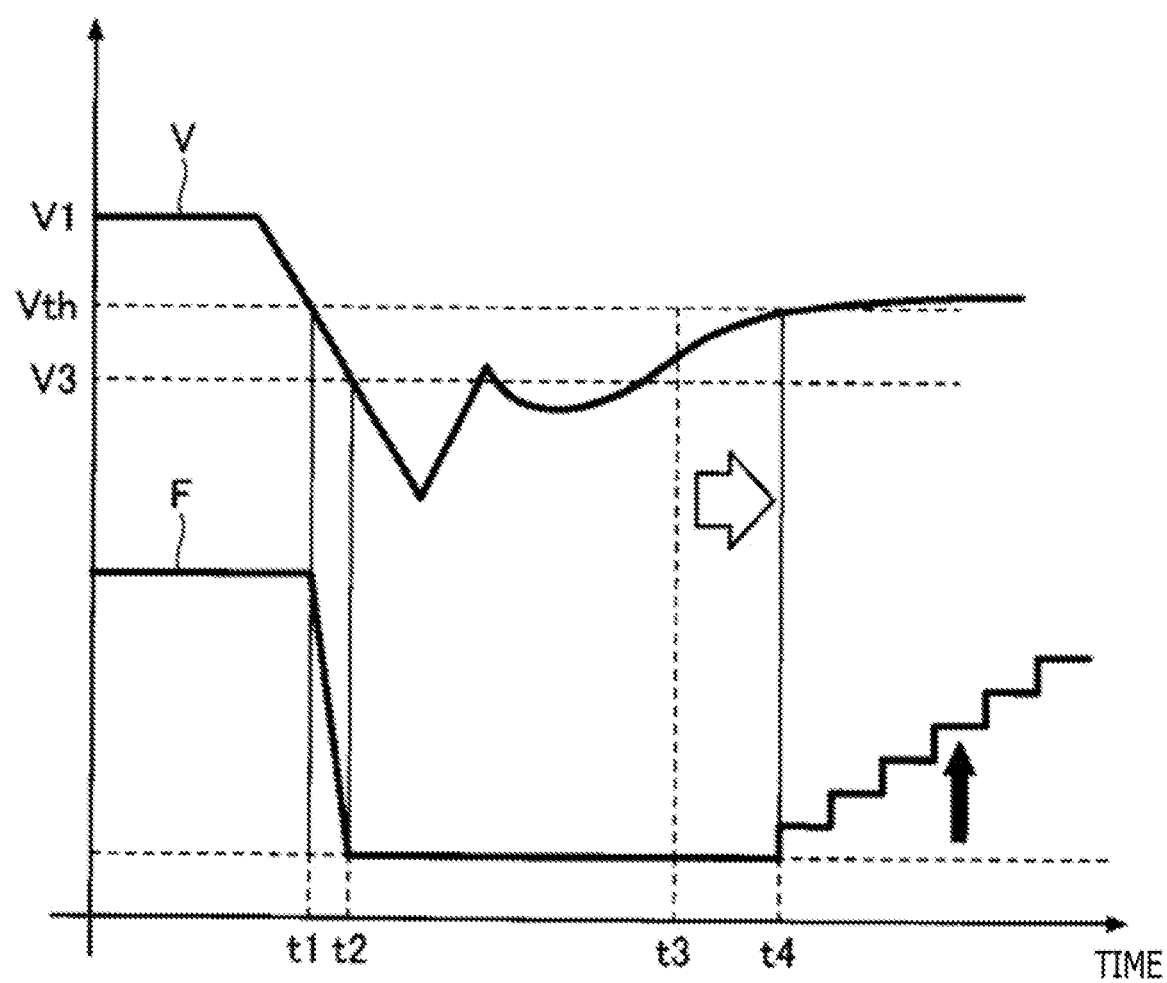
FIG. 13 is a diagram illustrating an example of a method for restoring the clock frequency with the plurality of cores.

FIG. 12 is a diagram illustrating an example of a case where the clock frequency is restored with a plurality of cores. FIG. 12 illustrates a state where all the ACCs of the cores 1 to 9 are activated (on). FIG. 13 is a diagram illustrating an example of a method for restoring the clock frequency with the plurality of cores. When detecting that a power supply voltage V of the own core drops to a value lower than the reference value Vth (timing t1), the clock control circuit of each core decreases a clock frequency F of the own core to a value lower than the voltage value V3 (timing t2). As a result, the occurrence of the timing error in each core can be suppressed due to the drop of the power supply voltage V of each core. When detecting that the power supply voltage V of the own core is increased and recovered to a value equal to or more than the reference value Vth after the clock frequency F of the own core is decreased (timing t3), the clock control circuit of each core increases the clock frequency F of the own core.

In a case of FIGS. 12 and 13, because all the ACCs of the plurality of cores adjacent to the own core are activated, the clock control circuit of each core predicts that the power supply voltage V of the own core is recovered at a relatively late stage. Therefore, the clock control circuit of each core increases the clock frequency F of the own core at a relatively low speed corresponding to the prediction result. As a result, it is possible to suppress the performance deterioration of the semiconductor device due to the reactivation of the ACC.

Furthermore, when the power supply voltage of the other core is high, the clock control circuit of the own core increases the speed, at which the clock frequency of the own core is increased, compared to when the power supply voltage of the other core is low. For example, in FIGS. 10 and 12, the clock control circuit of the core 5 increases the speed at which the clock frequency of the core 5 is increased (FIG. 11) when a power supply voltage of the core 2 adjacent to the core 5 is high (FIG. 10) compared to when the power supply voltage of the core 2 is low (FIG. 12). This can avoid the performance deterioration of the semiconductor device from being prolonged. The same applies to the clock control circuits of the cores other than the core 5.

Alternatively, when the clock frequency of the other core is high, the clock control circuit of the own core increases the speed at which the clock frequency of the own core is increased compared to when the clock frequency of the other core is low. For example, in FIGS. 10 and 12, the clock control circuit of the core 5 increases the speed at which the clock frequency of the core 5 is increased (FIG. 11) when the clock frequency of the core 2 adjacent to the core 5 is high (FIG. 10) compared to when the clock frequency of the core 2 is low (FIG. 12). This can avoid the performance deterioration of the semiconductor device from being prolonged. The same applies to the clock control circuits of the cores other than the core 5.

Figure 14:
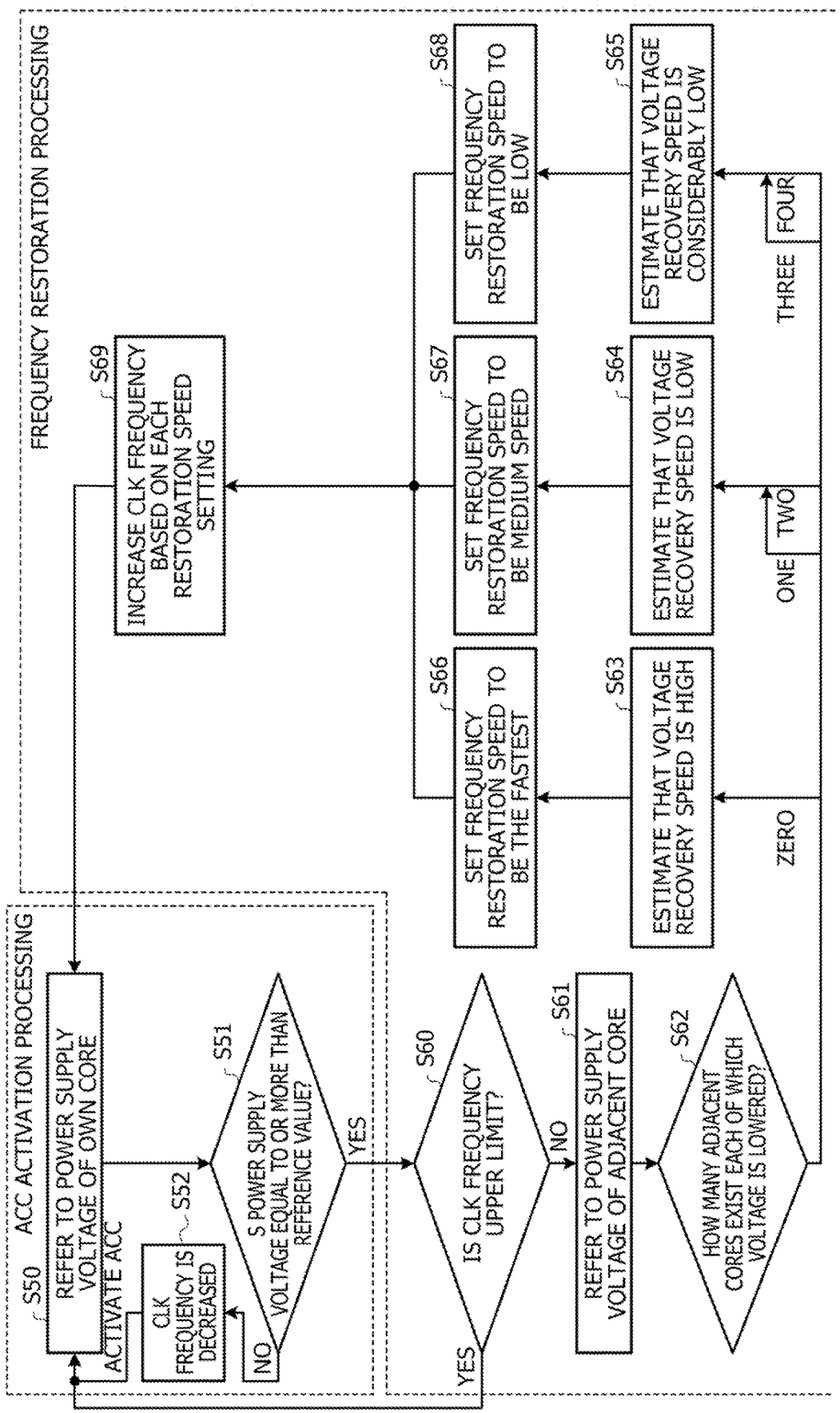
FIG. 14 is a diagram illustrating an example of a method for restoring the clock frequency according to the power supply voltage.

FIG. 14 is a diagram illustrating an example of a method for adjusting a speed at which the own clock frequency is increased according to the situation of the power supply voltage of the own processor core and the situations of the power supply voltages of the other processor cores after the own clock frequency is decreased. FIG. 14 illustrates processing executed by the respective clock control circuit of the plurality of cores.

The clock control circuit refers to the power supply voltage of the own core (step S50) and determines whether or not the power supply voltage of the own core is equal to or more than a reference value (step S51). In a case where the clock control circuit has determined that the power supply voltage of the own core is not equal to or more than the reference value (that is, for example, a case of detecting that power supply voltage of own core drops to value equal to or less than reference value), the clock control circuit activates the ACC and decreases the clock frequency of the own core (step S52). Thereafter, the clock control circuit executes the determination processing in step S50. On the other hand, in a case where it is determined in step S51 that the power supply voltage of the own core is equal to or more than the reference value (that is, for example, a case where it is detected that power supply voltage of own core is increased and is recovered to be value equal to or more than reference value), the clock control circuit executes frequency restoration processing in step S60 and subsequent steps.

In step S60, the clock control circuit determines whether or not the clock frequency is an upper limit value. In a case of determining that the clock frequency is the upper limit value, the clock control circuit executes the determination processing in step S50. On the other hand, in a case of determining that the clock frequency is not the upper limit value, the clock control circuit determines that the clock frequency is not restored to the original value and executes processing in step S61.

The clock control circuit refers to the power supply voltages of the other cores such as adjacent cores (step S61) and determines the number of cores of which the power supply voltage is dropped to a value equal to or less than a reference value (step S62). As the number of other cores of which the power supply voltage is dropped to the value equal to or less than the reference value is fewer, the clock control circuit increases the increasing speed of the clock frequency of the own core. The clock control circuit dynamically changes the restoration speed of the clock frequency of the own core so that a restoration time of the clock frequency of the own core becomes the shortest, within a range in which the re-drop of the power supply voltage of the own core to the value equal to or less than the reference value is not detected.

The clock control circuit selects the fastest speed from among a plurality of speed candidates within a range in which the drop of the power supply voltage of the own core is not detected according to the situations of the power supply voltages of the other cores and increases the clock frequency of the own core at the selected fastest speed.

When the power supply voltages of all the other cores are not dropped (for example, zero), the clock control circuit estimates that the recovery speed of the power supply voltage of the own core is high (step S63), and sets the restoration speed of the clock frequency of the own core to be high (step S66). When the power supply voltages of some of the other cores are dropped (for example, one or two), the clock control circuit estimates that the recovery speed of the power supply voltage of the own core is slow (step S64) and sets the restoration speed of the clock frequency of the own core to be a medium speed (step S67). When the power supply voltages of almost all or all of the other cores are dropped (for example, equal to or more than three), the clock control circuit estimates that the recovery speed of the power supply voltage of the own core is considerably low (step S65) and sets the restoration speed of the clock frequency of the own core to be low (step S68). The clock control circuit increases the clock frequency of the own core at the speed set in any one of steps S66, S67, and S68 (step S69) and returns to the determination processing in step S50.

According to the method illustrated in FIG. 14, it is possible to suppress the performance deterioration of the semiconductor device due to the reactivation of the ACC.

Figure 15:
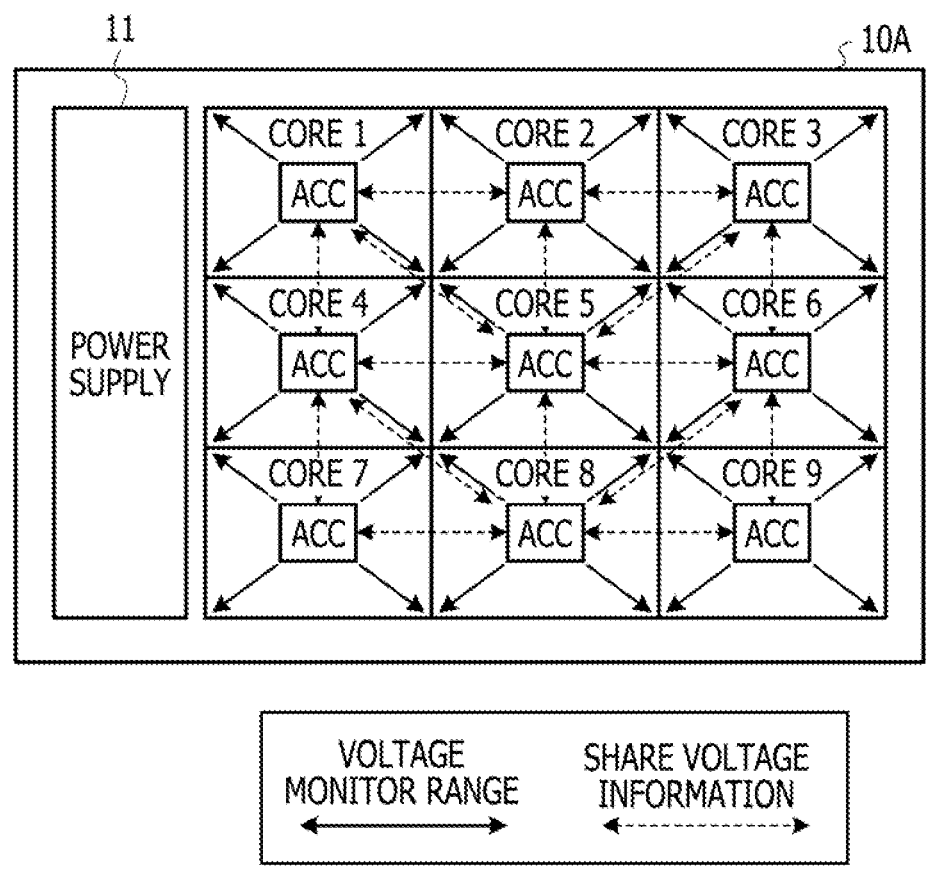
FIG. 15 is a diagram illustrating an exemplary configuration of a semiconductor device in which information regarding the power supply voltage is shared between cores.

FIG. 15 is a diagram illustrating an exemplary configuration of a semiconductor device in which information indicating situations of power supply voltages of respective cores is shared between ACCs of the respective cores. A semiconductor device 10A illustrated in FIG. 15 includes an interconnection-type ACC that transmits or receives the information in one-to-one connection in each core.

Figure 16:
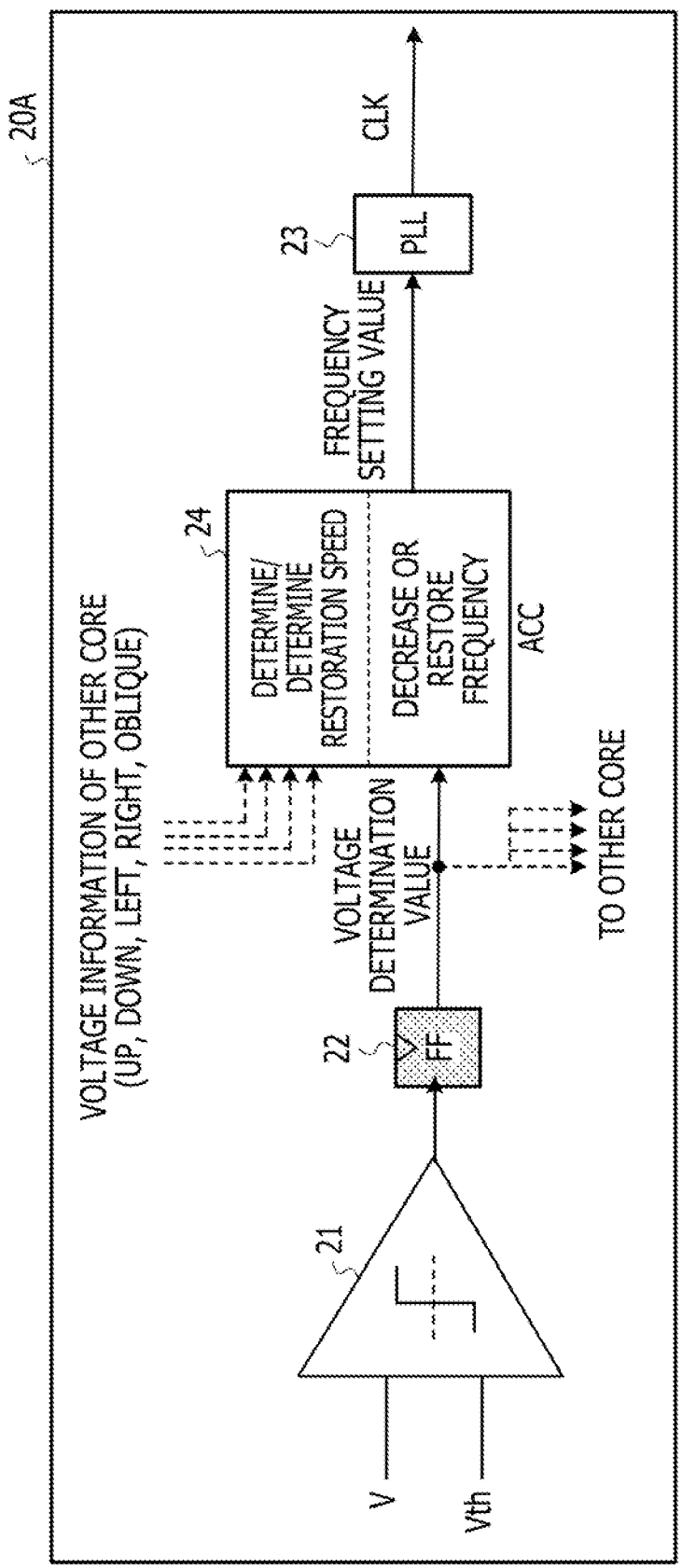
FIG. 16 is a diagram illustrating an exemplary configuration of a clock control circuit in which the information regarding the power supply voltage is shared between cores.

FIG. 16 is a diagram illustrating an exemplary configuration of a clock control circuit in which information indicating situations of power supply voltages of respective cores is shared between ACCs of the respective cores. A clock control circuit 20A illustrated in FIG. 16 is provided in each of the plurality of cores. The clock control circuit 20A includes a detector 21, a FF 22, a setting circuit 24, and a phase locked loop (PLL) 23. A difference between the power supply voltage V of the own core and the reference value Vth are detected by the detector 21. The detector 21 is, for example, a comparator. A detection result of the detector 21 is input to the FF 22. The FF 22 transmits a voltage determination value indicating whether the power supply voltage V is lower or higher than the reference value Vth to one or a plurality of other cores and supplies the voltage determination value to the setting circuit 24. The setting circuit 24 selects a restoration speed corresponding to a decrease situation of the power supply voltage of the other core according to the information received from the one or plurality of other cores (information indicating situation of power supply voltage, for example, voltage determination value) from among a plurality of speed candidates and sets the selected restoration speed. The setting circuit 24 supplies a restoration speed setting value of the clock frequency to the PLL 23. The PLL 23 increases a clock frequency CLK of the own core at the restoration speed set by the setting circuit 24.

Figure 17:
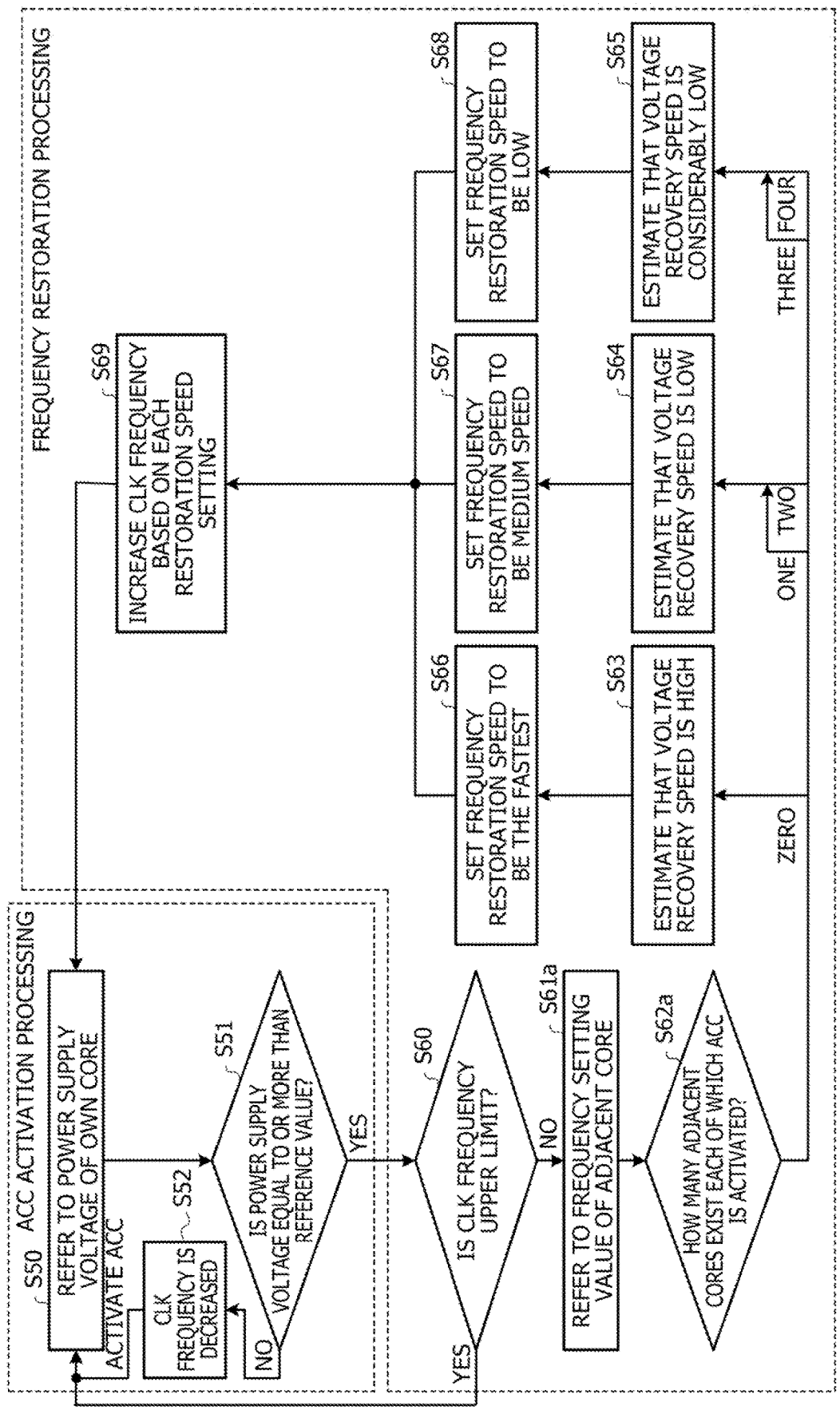
FIG. 17 is a diagram illustrating an example of a method for restoring a clock frequency according to a clock frequency of another core.

FIG. 17 is a diagram illustrating an example of a method for adjusting a speed at which the own clock frequency is increased according to the situation of the power supply voltage of the own processor core and the situations of the clock frequencies of the other processor cores after the own clock frequency is decreased. FIG. 17 illustrates processing executed by the respective clock control circuit of the plurality of cores. In FIG. 17, processing in steps S61a and S62a is executed instead of steps S61 and S62 in FIG. 14.

The clock control circuit refers to the clock frequencies of the other cores such as adjacent cores (step S61a) and determines the number of the other cores of which the ACCs are activated (step S62a). As the number of the other cores of which the ACCs are activated is fewer (that is, for example, clock frequency is decreased), the clock control circuit increases the speed at which the clock frequency of the own core is increased. The clock control circuit dynamically changes the restoration speed of the clock frequency of the own core so that a restoration time of the clock frequency of the own core becomes the shortest, within a range in which the re-drop of the power supply voltage of the own core to the value equal to or less than the reference value is not detected.

The clock control circuit selects the fastest speed from among a plurality of speed candidates within a range in which the drop of the power supply voltage of the own core is not detected according to the situations of the clock frequencies of the other cores and increases the clock frequency of the own core at the selected fastest speed.

When the clock frequencies of all the other cores are not decreased (for example, zero), the clock control circuit estimates that the recovery speed of the power supply voltage of the own core is high (step S63), and sets the restoration speed of the clock frequency of the own core to be high (step S66). When the clock frequencies of some of the other cores are decreased (for example, one or two), the clock control circuit estimates that the recovery speed of the power supply voltage of the own core is low (step S64) and sets the restoration speed of the clock frequency of the own core to be a medium speed (step S67). When the clock frequencies of almost all or all of the other cores are decreased (for example, equal to or more than three), the clock control circuit estimates the recovery speed of the power supply voltage of the own core is considerably low (step S65) and sets the restoration speed of the clock frequency of the own core to be low (step S68). The clock control circuit increases the clock frequency of the own core at the speed set in any one of steps S66, S67, and S68 (step S69) and returns to the determination processing in step S50.

According to the method illustrated in FIG. 17, it is possible to suppress the performance deterioration of the semiconductor device due to the reactivation of the ACC.

Figure 18:
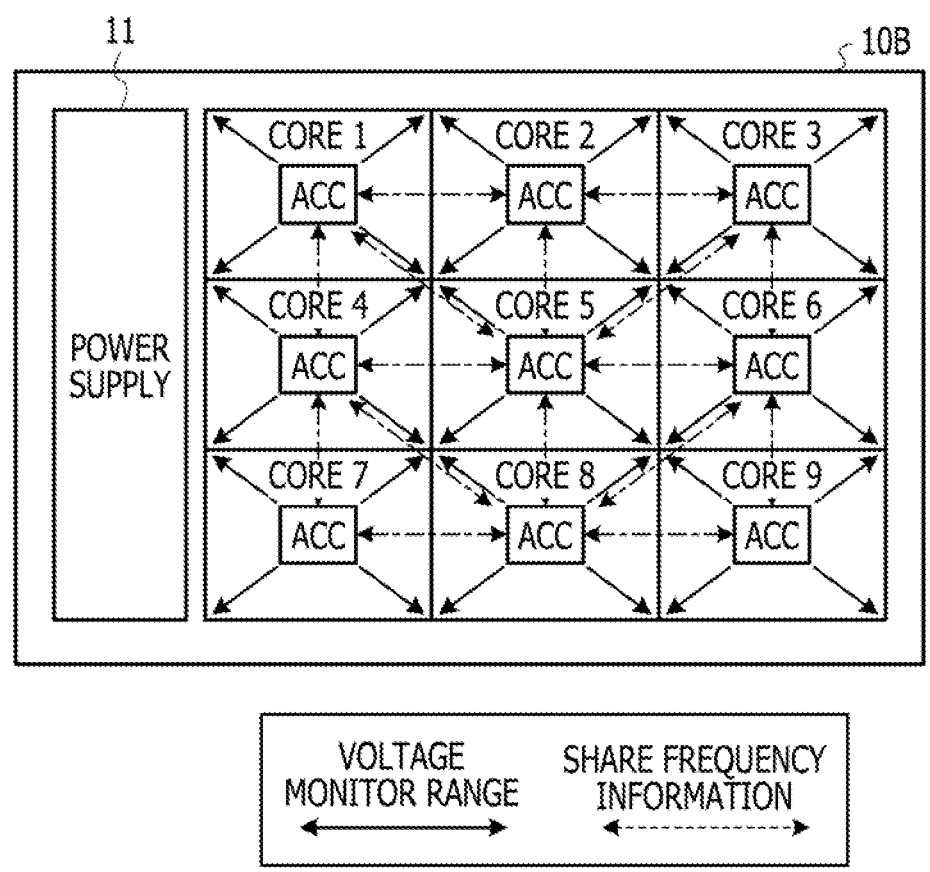
FIG. 18 is a diagram illustrating an exemplary configuration of a semiconductor device in which information regarding the clock frequency is shared between the cores.

FIG. 18 is a diagram illustrating an exemplary configuration of a semiconductor device in which information Indicating situations of clock frequencies of respective cores is shared between ACCs of the respective cores. A semiconductor device 10B illustrated in FIG. 18 includes an interconnection-type ACC that transmits or receives the information in one-to-one connection in each core.

Figure 19:
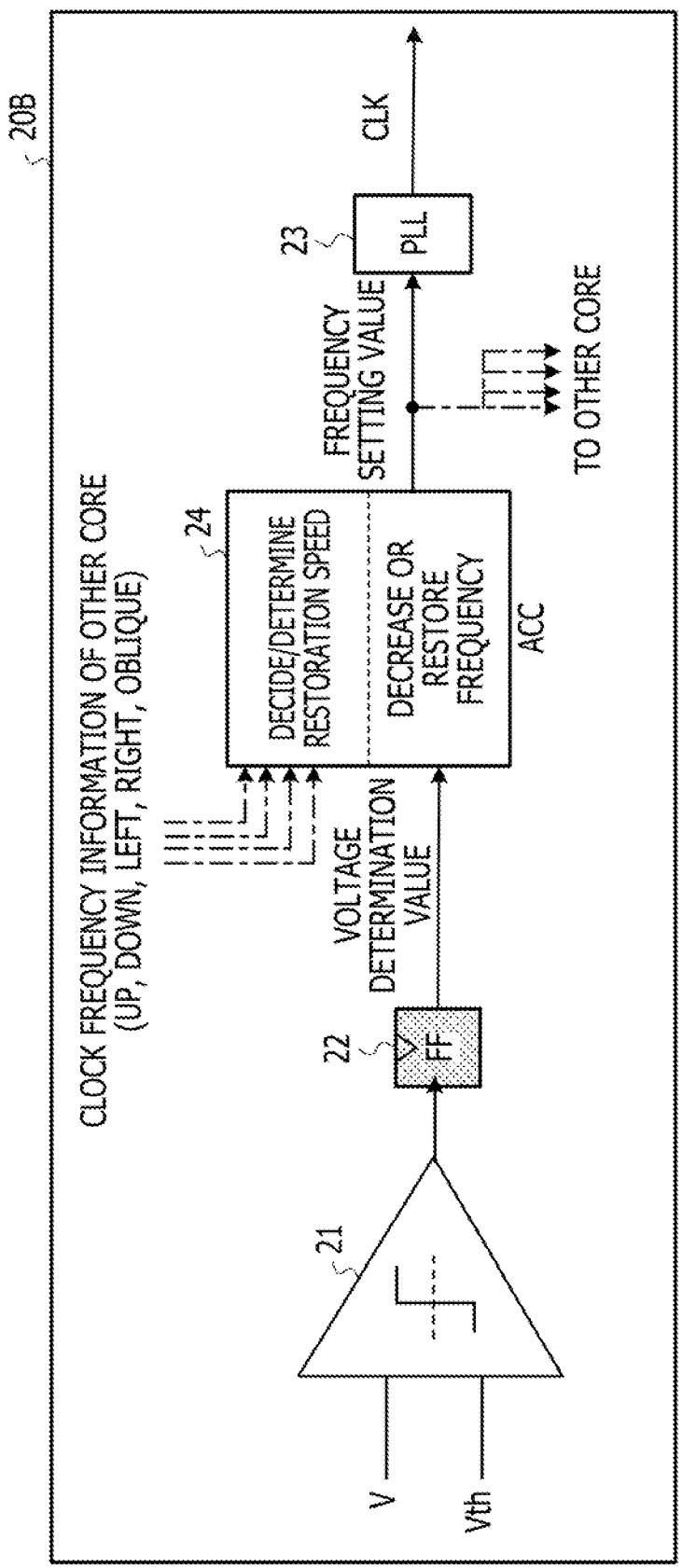
FIG. 19 is a diagram illustrating an exemplary configuration of a clock control circuit in which the information regarding the clock frequency is shared between the cores.

FIG. 19 is a diagram illustrating an exemplary configuration of a clock control circuit in which information indicating situations of clock frequencies of respective cores is shared between ACCs of the respective cores. A clock control circuit 20B illustrated in FIG. 19 is provided in each of the plurality of cores. The clock control circuit 20B includes a detector 21, a FF 22, a setting circuit 24, and a phase locked loop (PLL) 23. A difference between the power supply voltage V of the own core and the reference value Vth are detected by the detector 21. The detector 21 is, for example, a comparator. A detection result of the detector 21 is input to the FF 22. The FF 22 supplies a voltage determination value indicating whether the power supply voltage V is lower or higher than the reference value Vth to the setting circuit 24. The setting circuit 24 selects a restoration speed corresponding to a decrease situation of the power supply voltage of the other core according to the information received from the one or plurality of other cores (information indicating situation of clock frequency, for example, voltage determination value) from among a plurality of speed candidates and sets the selected restoration speed. The setting circuit 24 transmits the restoration speed setting value of the clock frequency to the one or plurality of other cores and supplies the restoration speed setting value to the PLL 23. The PLL 23 increases a clock frequency CLK of the own core at the restoration speed set by the setting circuit 24.

Figure 20:
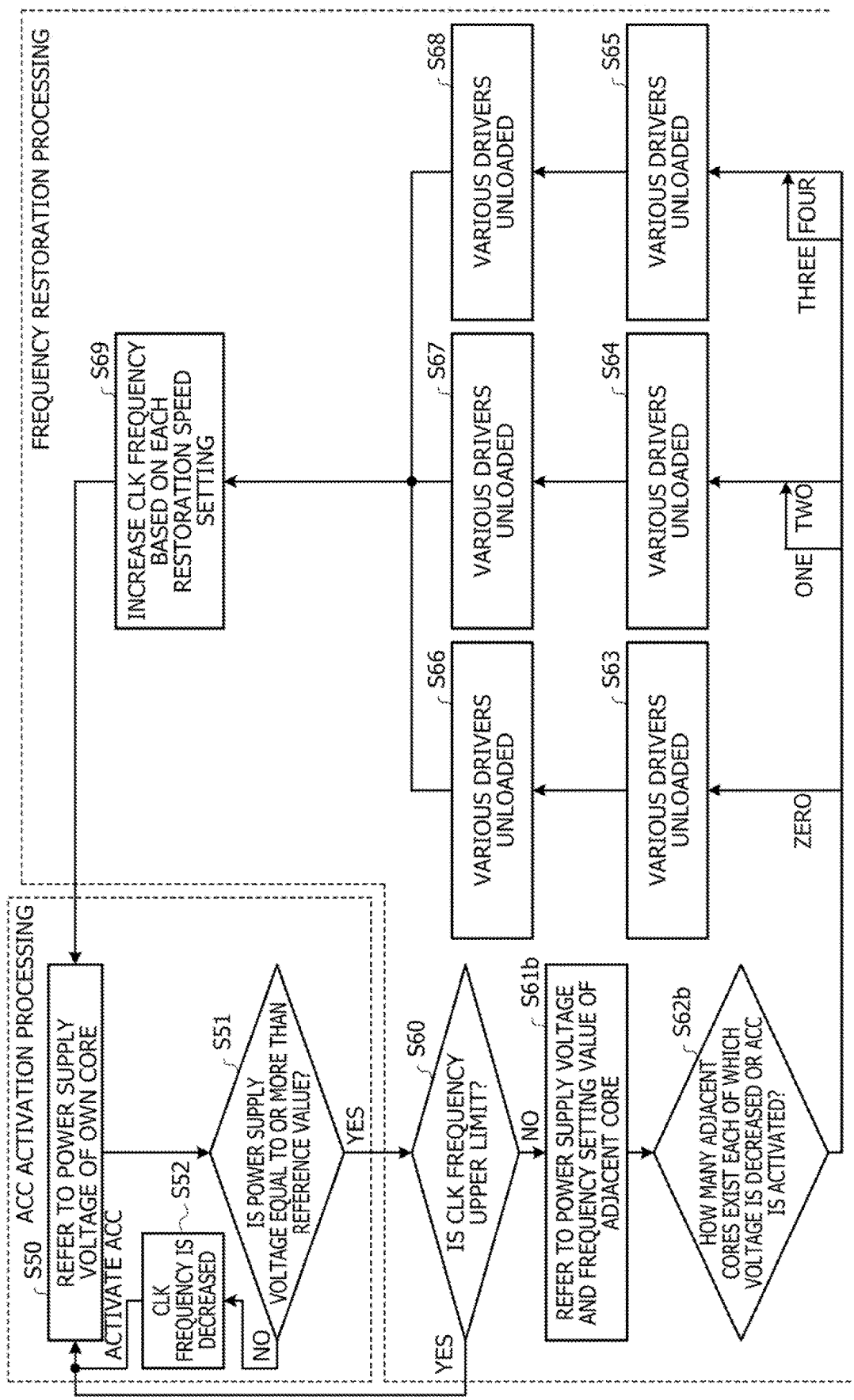
FIG. 20 is a diagram illustrating an example of a method for restoring a clock frequency according to a power supply voltage and a clock frequency of another core.

FIG. 20 is a diagram illustrating an example of a method for adjusting a speed at which the own clock frequency is increased according to the situation of the power supply voltage of the own processor core, the situations of the power supply voltages of the other processor cores, and the situations of the clock frequencies of the other processor cores after the own clock frequency is decreased. FIG. 20 illustrates processing executed by the clock control circuit of each of the plurality of cores. In FIG. 20, processing in steps S61b and S62b is executed instead of steps S61 and S62 in FIG. 14.

The clock control circuit refers to the power supply voltages and the clock frequencies of the other cores such as adjacent cores (step S61b) and determines the number of the other cores of which the power supply voltage is dropped to a value equal to or less than the reference value or of which the ACC is activated (step S62b). That is, for example, FIG. 20 illustrates a method in which steps S61 and S62 in FIG. 14 and steps S61a and S62a in FIG. 17 are combined.

According to the method illustrated in FIG. 20, it is possible to suppress the performance deterioration of the semiconductor device due to the reactivation of the ACC.

FIG. 21 is a diagram illustrating an exemplary configuration of a semiconductor device in which information indicating situations of power supply voltages of respective cores and information indicating situations of clock frequencies of the respective cores are shared between ACCs of the respective cores. A semiconductor device 10C illustrated in FIG. 21 includes an interconnection-type ACC that transmits or receives the information in one-to-one connection in each core.

Figure 22:
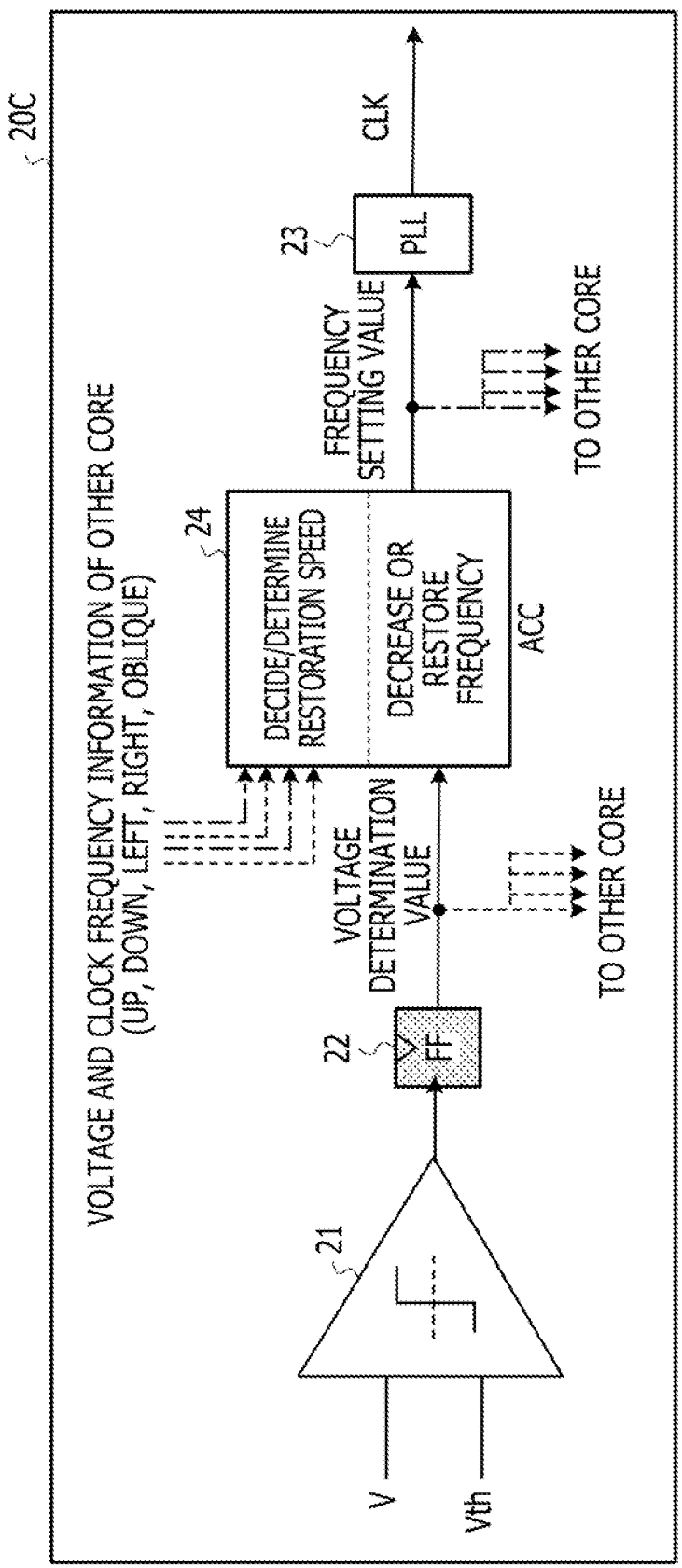
FIG. 22 is a diagram illustrating an exemplary configuration of a clock control circuit in which the information regarding the power supply voltage and the clock frequency is shared between the cores.

FIG. 22 is a diagram illustrating an exemplary configuration of a clock control circuit in which information indicating situations of power supply voltages of respective cores and information indicating situations of clock frequencies of the respective cores are shared between ACCs of the respective cores. The clock control circuit 20C illustrated in FIG. 22 is provided in each of the plurality of cores. That is, for example, FIG. 22 illustrates a configuration in which the configuration in FIG. 16 and the configuration in FIG. 19 are combined.

While the embodiments have been described thus far, the technology of the present disclosure is not restricted to the above-described embodiments. Various modifications and improvements such as combination and replacement with some or all of other embodiments may be allowed.

For example, the semiconductor device may be a semiconductor device such as a Field Programmable Gate Array (FPGA) including a plurality of processor cores.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
a power supply; and
a plurality of processor cores configured to operate with the power supply,
each of the plurality of processor cores includes a clock control circuit that decreases an own clock frequency used by an own processor core when detecting drop of a power supply voltage of the own processor core, and adjusts, based on a situation of a power supply voltage of another processor core among the plurality of processor cores, a speed at which the own clock frequency is increased.

2. The semiconductor device according to claim 1, wherein the clock control circuit increases the own clock frequency at a speed set according to the situation of the power supply voltage of the other processor core.

3. The semiconductor device according to claim 2, wherein the clock control circuit selects a fastest speed from among a plurality of speed candidates within a range, in which the drop of the power supply voltage of the own processor core is not detected, according to the situation of the power supply voltage of the other processor core and increases the own clock frequency at the selected fastest speed.

4. The semiconductor device according to claim 1, wherein the clock control circuit adjusts the speed at which the own clock frequency is increased according to the situation of the power supply voltage of the own processor core and the situation of the power supply voltage of the other processor core after the own clock frequency is decreased.

5. The semiconductor device according to claim 4, wherein the clock control circuit adjusts the speed at which the own clock frequency is increased according to the situation of the power supply voltage of the other processor core when the power supply voltage of the own processor core is recovered after the own clock frequency is decreased.

6. The semiconductor device according to claim 1, wherein the clock control circuit increases the speed at which the own clock frequency is increased as the number of the other processor cores of which power supply voltages are dropped is fewer.

7. The semiconductor device according to claim 1, wherein when the power supply voltage of the other processor core is high, the clock control circuit increases the speed at which the own clock frequency is increased compared to when the power supply voltage of the other processor core is low.

8. The semiconductor device according to claim 1, wherein the clock control circuit receives the situation of the power supply voltage of the other processor core from the other processor core and transmits the situation of the power supply voltage of the own processor core to the other processor core.

9. The semiconductor device according to claim 1, wherein the clock control circuit adjusts the speed at which the own clock frequency is increased according to a situation of another clock frequency used by the other processor core.

10. A semiconductor device comprising:
a plurality of processor cores configured to operate with a power supply,
each of the plurality of processor cores includes a clock control circuit that decreases an own clock frequency used by an own processor core when detecting drop of a power supply voltage of the own processor core, and adjusts, based on a situation of another clock frequency used by another processor core among the plurality of processor cores, a speed at which the own clock frequency is increased.

11. The semiconductor device according to claim 10, wherein the clock control circuit increases the own clock frequency at a speed set according to the situation of the other clock frequency.

12. The semiconductor device according to claim 11, wherein the clock control circuit selects a fastest speed from among a plurality of speed candidates within a range, in which the drop of the power supply voltage of the own processor core is not detected, according to the situation of the other clock frequency and increases the own clock frequency at the selected fastest speed.

13. The semiconductor device according to claim 10, wherein the clock control circuit adjusts a speed at which the own clock frequency is increased according to the situation of the power supply voltage of the own processor core and the situation of the other clock frequencies after the own clock frequency is decreased.

14. The semiconductor device according to claim 13, wherein the clock control circuit adjusts the speed at which the own clock frequency is increased according to the situation of the other clock frequency when the power supply voltage of the own processor core is recovered after the own clock frequency is decreased.

15. The semiconductor device according to claim 10, wherein the clock control circuit increases the speed at which the own clock frequency is increased as the number of the other processor cores of which the other clock frequencies are decreased is fewer.

16. The semiconductor device according to claim 10, wherein when the other clock frequency is high, the clock control circuit increases the speed at which the own clock frequency is increased compared to when the other clock frequency is low.

17. The semiconductor device according to claim 10, wherein the clock control circuit receives the situation of the other clock frequency from the other processor core and transmits information regarding the own clock frequency to the other processor core.

18. The semiconductor device according to claim 10, wherein the other processor core is a processor core adjacent to the own processor core.

* * * * *